J. L. STEWART.
APPARATUS FOR MANUFACTURING GAS.
No. 10,436. Reissued Jan. 8, 1884.
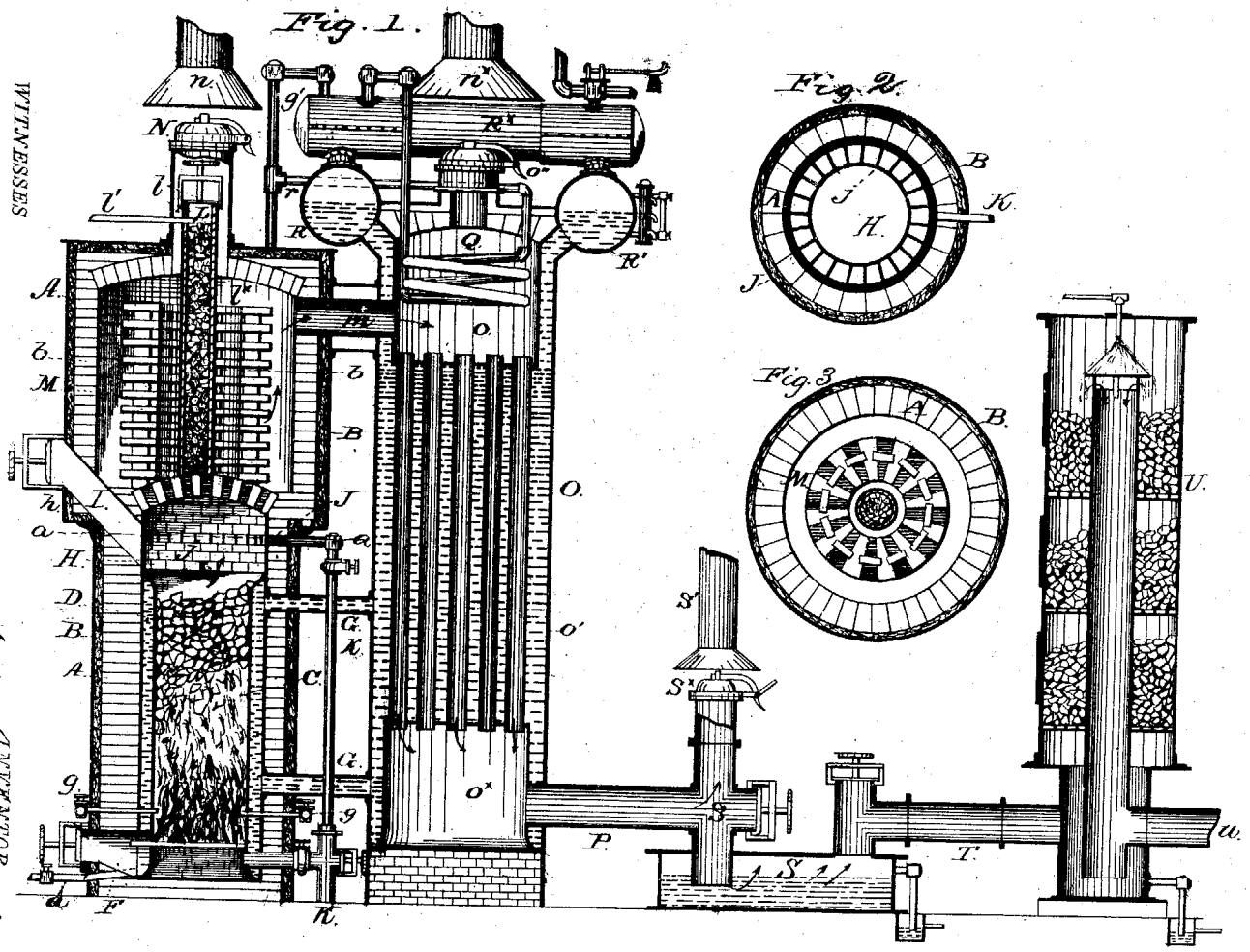
WITNESSES
Geo. H. Harvey
Edward E. Ellis
INVENTOR
John L. Stewart
per O. E. Duff
Attorney

UNITED STATES PATENT OFFICE.

JOHN L. STEWART, OF PHILADELPHIA, PENNSYLVANIA.

APPARATUS FOR MANUFACTURING GAS.

SPECIFICATION forming part of Reissued Letters Patent No. 10,436, dated January 8, 1884.

Original No. 282,399, dated July 31, 1883. Application for reissue filed November 15, 1883.

*To all whom it may concern:*

Be it known that I, JOHN L. STEWART, of Philadelphia, in the county of Philadelphia and State of Pennsylvania, have invented certain new and useful Improvements in Apparatus for Manufacturing Gas; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

My invention relates to apparatus for manufacturing illuminating and heating gas by decomposing steam in contact with incandescent carbonaceous fuel in a generating-furnace, vaporizing hydrocarbon oil, mixing the resulting vapors with the gases from the decomposed steam, and converting the mixture into a fixed gas in contact with heated surfaces in a fixing-chamber.

The object of the invention is to improve the generating-furnace, so as to prevent the adhesion of clinker to the walls thereof, and at the same time provide an economical and convenient construction and arrangement of the vaporizing-chamber and the fixing-chamber or superheater in connection with the generator.

Heretofore in the construction of the class of generating apparatus to which mine belongs it has been customary to place the fixing or superheating chamber containing refractory brick-work in a position detached from the generator or alongside of it, and, in structures where such fixing-chamber has been placed in the top of the generator or directly above it, much difficulty has arisen in the effort to keep the walls of the generator free from clinker, as the presence of the superheater and fixing-chamber at the top of the generating-chamber made it impossible to successfully insert bars for detaching the clinker which adhered to the brick walls of the chamber. It is quite desirable in practice, however, as regards economy in construction and operation, to place the fixing-chamber in the top of the generating-cupola or directly above the decomposing-chamber, and, in order to overcome the difficulties of clinking, I place a metallic water-jacket in the fuel-chamber, so as to form the internal lining thereof for several feet above the grate or bottom of the ash-pit. Clinker does not adhere to the metallic surface of the water-jacket, and the use of clinking-bars is therefore obviated, and consequently the fixing-chamber may be placed in the most advantageous position above the fuel and generating chamber. The water-jacket therefore serves an important and useful function in connection with the generating-chamber and the fixing-chamber. The cylindriform water-jacket is set within the brick or masonary of the casing of the fuel-chamber, and is provided with inlet and outlet water-pipes.

The construction of my apparatus is illustrated in the accompanying drawings, in which Figure 1 represents in central vertical longitudinal sectional elevation an apparatus conveniently embodying my improvements; Fig. 2, a sectional plan taken on a horizontal plane projected on the dotted line *a a* of Fig. 1 of the air-distributer which communicates with the mixing-chamber, and Fig. 3 a similar view on the line *b b* of Fig. 1 of the gas-superheater.

Similar letters of reference indicate corresponding parts in all the figures of drawings.

In the accompanying drawings, A represents a vertically erected and preferably cylindriform hollow casing composed of fire-brick or other suitable refractory substance, preferably incased in an envelope, B, of sheet-iron. Within the hollow interior of this casing are contained the gas-generator or combustion-chamber, the mixing-chamber, the gas-superheater, the retort within which the liquid hydrocarbon is vaporized, while various connections for steam, air, and liquid hydrocarbons are applied to it, as are also other connections hereinafter more fully described.

C is the gas-generating chamber, located in the lower portion of the casing, and formed by a cylindriform water-jacket, D, set within the brick-work or masonry of the casing, and provided with a water-inlet, *d*, through which water is forced into the jacket. The jacket is at its upper extremity in communication with the mixing-chamber, which is formed within the casing immediately below the fixing-chamber or superheater and above the gas-generating chamber, and at its lower extremity is conformed into or adapted to inclose a fire-box. The box is provided with a grate, upon which the charge within the generator rests. A port, F, having a close-fitting door is provided for removal of ashes.

Passage G, leading from the water-jacket to the water-space of the boiler hereinafter described, permits free circulation of water between the two and generation of steam.

Steam-inlet pipes *g* open into the fuel-chamber, within the interior of the water-jacket, for introducing steam to the charge. They are fed from a steam-supply pipe, *g*, leading from the major steam-drum, as hereinafter described.

H is the mixing-chamber, in the wall of which the air-blast is superheated, and in which combustion of gas from the generator takes place for heating the superheater or fixing-chamber at the time the air-blast is being admitted to the base of the fuel. Water-gas and oil-vapor are mixed in this chamber preparatory to their passage into the fixing-chamber above, which chamber is separated from the generator by an arch of masonry, which supports the retort and the shelves or other refractory bodies contained in the fixing-chamber.

I is a charging-chute opening into the mixing-chamber, above the water-jacket, for the purpose of charging the generator.

J is an air-distributer, represented in sectional plan in Fig. 2, and being, in the apparatus described, a circular channel built in the masonry of the casing above the mixing-chamber, and communicating with the latter at a point below the arch by means of radially-disposed tuyeres *j*.

K is an air-supply pipe, supposed to be in communication with any suitable fan or other blast-producing device and opening into the air-distributer, and also into the gas-generator at a point or points below the charge.

L is a retort vertically erected concentrically within the superheater or fixing-chamber, and conveniently supported upon the arch which divides the mixing-chamber from said fixing-chamber. It is preferably made of fire-clay lined with iron, and is provided with a cover, *l*, adapted to be removed, to enable the burning out of any fixed carbon, should the latter collect upon the inside of the retort, the burning out being effected at the time when the generator is being heated up. The retort is internally provided with broken fire-brick, $l^{\times}$, or other refractory substances, or, if desired, with downwardly-inclined projections, ledges, or kindred contrivances, the office of which is to retard the too rapid descent of the atomized liquid hydrocarbons, in order that they may be converted into vapor before reaching the discharging orifice or outlet at the bottom of the retort, and thereby to prevent the decomposition of a portion of the rich hydrocarbons into fixed carbon by the falling of said hydrocarbons in a liquid condition into the body of incandescent carbon in the generator below.

*l'* is an inlet for oils or liquid hydrocarbons, which is arranged to open into the upper portions of the retort at a point below the retort-cover, and which is formed and directed in such manner as to occasion the atomizing of the oils at the top of the retort.

M is the gas-superheater or fixing-chamber, which is preferably a cylindriform chamber formed in the upper portion of the casing, which at such portion is preferably enlarged, as shown, concentrically around the retort above the supporting-arch. It has communication with the smoke-space of the steam-boiler by means of the lateral conduit *m*, and is closed at the top by a gas-tight valve or cover, N, of any suitable construction, and placed in line below a stack or funnel, *n*. The office of the superheating-chamber, as such, is the fixing of the gases, as well understood.

O is a vertical boiler, erected in convenient proximity to the casing above described, and connected in fixed relation thereto by means of the above-described conduit *m*, leading from the superheater into its smoke-space, and by means of the passage G, leading from the water-jacket of the generator into its water-space. This boiler conveniently contains an upper smoke-chamber, *o*, and a lower smoke-chamber, $o^{\times}$, which are connected by a series of vertical smoke-tubes, *o'*. The conduit *m*, leading from the superheater, communicates with the upper smoke-chamber, and a discharge-conduit, P, leads from the lower smoke-chamber to the wash-box hereinafter described. At its upper end the boiler is provided with a safety-valve or man-hole cover, *o''*, in line below a stack, $n^{\times}$.

R R' are two minor steam-drums communicating with the water-space of the boiler, at the upper portion thereof, and, for convenience, disposed upon opposite sides of the boiler, and suitably bracketed or supported therefrom. They both communicate with a major steam-drum, $R^{\times}$, suitably supported transversely upon said minor drums, and acting as a steam-reservoir. These drums are suitably supplied with gages, safety-valves, and other common contrivances.

Q is a superheating-worm coiled in the upper smoke-chamber of the boiler, communicating at one extremity with the major steam-drum and at the other extremity with a pipe, *r*, leading to a steam-supply pipe, *g'*, which latter pipe is also, if desired, in communication with and fed from the major steam-drum. This arrangement of worm and connecting-pipes can be modified at will, that arrangement which I have represented being, however, convenient. By the provision of suitable cocks, the generator can be fed either with wet or dry steam. By the application of the worm, I supply superheated steam through the steam-inlets *g*, which open within the interior of the water-jacket to the charge in the generator. As will be readily understood, the water heated in the water-jacket circulates throughout the water-space of the boiler, and aids in the generation of steam, which, as stated, is introduced to the charge, while first the waste heat and then the highly-heated gases from the superheater pass through the conduit *m* to the upper smoke-chamber of the boiler, and thence pass through the smoke-tubes to the lower chamber, and pass out through the discharge-conduit P, in so doing having entered at the top of the boiler, where the water is hottest, and left at the bottom, where the water is coolest, thereby keeping up a continuous generation of steam and utilizing nearly all the heat from the generator.

S is a wash-box of any preferred construction, vertically above which is disposed a branch conduit, *s*, centrally into which opens the discharge-conduit P from the boiler. The upper extremity of this branch conduit opens in line below a stack, *s'*, and is controlled by a valve, $s^{\times}$, while the lower extremity opens below the level of the liquid in the wash-box. The wash-box communicates through an exit, T, with a scrubber, U, of any preferred construction, from out of which the gas is conducted to the purifiers and gas-holder through a second exit, *u*. That construction of the wash-box and scrubber represented is convenient. Other forms of devices for similar purposes may be substituted in their stead.

The valves upon the top of the superheater, boiler, and branch conduit all act both as man-hole covers and (being weighted) as safety-valves in case of any excess of pressure.

The generator-valves may be opened to permit the escape of waste hot products of combustion without passing it through the boiler in case too much steam is generated.

The valve $s^{\times}$ on the branch conduit is not only, when open, employed to permit of the escape into its stack of the waste gases after they have been passed through the boiler, but is also, when closed, designed to direct the passage of the hydrogen or hydrocarbon gas downwardly through the lower extremity of the branch conduit into the wash-box, and off through the scrubber and purifier to the gas-holder.

Having now described the form of apparatus conveniently embodying or effectuating my invention, I will now describe the operation of such apparatus, as follows: I first fill the water-jacket and boiler with water up to the water-line in the minor steam-drums, then open the valve $s^{\times}$ upon the branch conduit *s*, and then, keeping the boiler and superheater valves closed, charge the generator with coal or other desired carbonaceous material through the charging-chute I, and fire the same. The blast of air is then, under suitable regulation, admitted both into the bottom of the generator and through the air-distributer into the mixing-chamber. During this period of the operation the waste gases generated pass through the boiler, generate steam, and escape through the valve $s^{\times}$ at the top of the branch conduit. As soon as the generator is filled with incandescent carbon, both the superheater and retort heated to the proper temperature, and the steam in the boiler raised to the proper pressure, I shut off the air-blast and close valve $s^{\times}$ of the branch conduit, and at the same time turn on the steam into the incandescent carbon in the generator, and admit the liquid hydrocarbons under pressure into the top of the retort. The liquid hydrocarbons are atomized at the moment of their entrance into the highly-heated retort, and the atomized particles descend through the retort and are finally converted into vapor without coming into contact with the incandescent carbon or other highly-heated substance in the generator, and said vapors, entering the mixing-chamber, therein commingle with the gases escaping from the generator resulting from the decomposition of steam in its passage through the incandescent carbon, and after said commixture in the mixing-chamber pass up through the superheater or fixing-chamber, are decomposed, combined, and fixed therein, and pass out through its conduit into the upper smoke-chamber of the boiler, thence down through the tubes into the lower smoke-chamber, out through the discharge-conduit, and down through the closed branch conduit into the wash-box, whence they pass to the scrubber, purifiers, and to the gas-holder, where they are stored for distribution.

The above operation is to be repeated as a whole till the desired quantity of gas has been generated. In said operation, as will be readily understood, both the waste hot products of combustion and the highly-heated gases from the generator are in turn caused to pass through the same chambers and passage-ways to the discharge-conduit, and are there either discharged by the opening of its valve or forced through the water in the wash-box by its closure. In the passage they are both first caused to enter the boiler at the top, where the water is the hottest, and to leave it where the water is the coolest. The air-blast encountering the brick-work of the air-distributer and mixing-chamber becomes superheated, and, mixing with the gases from the generator, insures their more perfect combustion.

While it is desirable, it is not essential that the steam admitted to the generator should be superheated.

It will be understood that the liquid hydrocarbons, while atomized at the top of the retort and vaporized in the course of their passage down through it, are not decomposed until they commingle with the gas in the mixing-chamber and in their passage through the superheater or fixing-chamber. This is due to the fact that the retort, being heated externally, cannot become so highly heated in its interior as to occasion the decomposition of said hydrocarbon vapors in their passage through it.

An important advantage of the metallic water-jacket in a cupola-generator of the kind herein illustrated is that it prevents the adhesion of clinker to the wall of the fuel-chamber, and makes the use of clinker-bars unnecessary, whereby the superheater or fixing-chamber may be placed in the most advantageous position at the top of the generating-chamber, where it is most effectively heated by hot products of combustion, and where heat is the most economically utilized. Heretofore where the fixing-chamber was placed directly above the fuel and generating chamber its has been necessary to draw or let out the fire at stated intervals or periods, and for the workmen to get inside the furnace and chip off the clinker from the brick walls of the fuel-chamber. This has been a great annoyance, resulting in a waste of time, fuel, and labor. By my construction this difficulty is overcome, and the fire may be maintained continuously for any desired time with the greatest economy of heat, fuel, and labor.

Having thus described my invention, I claim and desire to secure by Letters Patent—

1. In an apparatus for producing heating and illuminating gas, the generator provided with a water-jacket and supply-pipes, in combination with the superheating and fixing chamber having an eduction-pipe, and the vertical retort open at the bottom, having an oil-inlet pipe near the top, and containing suitably disposed refractory material, whereby oil may be vaporized and the resulting vapors mixed with gas rising from the generator, and the mixture converted into a fixed gas in the fixing-chamber, substantially as set forth.

2. In an apparatus for manufacturing heating and illuminating gas, the combination of the generating-chamber, the water-jacket, and the superheater or fixing-chamber, located as described, whereby the use of a clinker-bar is avoided and the heat is economically utilized in the fixing-chamber.

3. In an apparatus for manufacturing heating and illuminating gas, the combination of the generator, the water-jacket therein and the superheater or fixing-chamber, containing refractory material, located as described, and having an oil-vaporizer therein, for the purpose described.

4. In an apparatus for producing heating and illuminating gas, the generator provided with a water-jacket and supply-pipes for air and steam, in combination with the superheating and fixing chamber, the steam-boiler, and pipes connecting the water-space of the boiler with the water-jacket of the generator, as and for the purpose described.

5. In an apparatus for producing heating and illuminating gas, the generator provided with a water-jacket and supply-pipes for air and steam, in combination with the superheating-chamber, an oil-vaporizer, the steam-boiler, a pipe connecting the smoke-flue thereof with the superheater, and pipes connecting the water-space of the boiler with the water-jacket of the generator, as and for the purpose described.

6. In an apparatus for producing heating and illuminating gas, in combination, a gas-generating chamber provided with an inclosing water-jacket, and a steam-boiler, the smoke-flues of which at one extremity communicate with said generating-chamber and at the other extremity with a discharge-conduit, and the water-space of which communicates with said water-jacket, as and for the purpose specified.

In testimony that I claim the foregoing I have hereunto set my hand this 23d day of October, 1883.

JOHN L. STEWART.

Witnesses:
B. F. MORSELL,
EDWARD E. ELLIS.